(12) United States Patent
Van Laak

(10) Patent No.: US 8,752,257 B2
(45) Date of Patent: Jun. 17, 2014

(54) ARRANGEMENT FOR SECURING A LINING MATERIAL

(75) Inventor: Hermann Van Laak, Hunxe (DE)

(73) Assignee: Plasticon Germany GmbH, Dinslaken (DE)

( * ) Notice: Subject to any disclaimer, the term of this patent is extended or adjusted under 35 U.S.C. 154(b) by 108 days.

(21) Appl. No.: 13/378,273

(22) PCT Filed: Jun. 10, 2010

(86) PCT No.: PCT/DE2010/000647
§ 371 (c)(1),
(2), (4) Date: Mar. 9, 2012

(87) PCT Pub. No.: WO2010/145636
PCT Pub. Date: Dec. 23, 2010

(65) Prior Publication Data
US 2012/0167363 A1    Jul. 5, 2012

(30) Foreign Application Priority Data

Jun. 18, 2009 (DE) .................. 10 2009 029 801
Jul. 9, 2009 (DE) .................. 10 2009 032 650

(51) Int. Cl.
*B23P 11/00* (2006.01)
*B23P 25/00* (2006.01)
*B23P 11/02* (2006.01)
*F16B 37/04* (2006.01)

(52) U.S. Cl.
USPC ............. 29/243.5; 29/458; 29/453; 411/180

(58) Field of Classification Search
USPC ....................................................... 29/243.5
See application file for complete search history.

(56) References Cited

U.S. PATENT DOCUMENTS

| | | | | |
|---|---|---|---|---|
| 4,711,012 A * | 12/1987 | Wolters | ............... | 29/243.518 |
| 4,722,647 A * | 2/1988 | Sawdon | ............... | 411/180 |
| 4,723,432 A * | 2/1988 | Whitley et al. | ............... | 72/325 |
| 8,302,272 B2 * | 11/2012 | Dear et al. | ............... | 29/243.517 |
| 8,371,017 B1 * | 2/2013 | Nikkel | ............... | 29/525.01 |
| 8,448,929 B2 * | 5/2013 | Prot et al. | ............... | 269/49 |
| 2001/0008040 A1 * | 7/2001 | Gonnet et al. | ............... | 29/453 |
| 2001/0037551 A1 * | 11/2001 | Peterson et al. | ............... | 29/458 |

FOREIGN PATENT DOCUMENTS

| | | |
|---|---|---|
| DE | 102005017921 A1 | 12/2006 |
| DE | 102006031225 A1 | 1/2008 |
| DE | 102007026733 A1 | 12/2008 |
| EP | 0081173 A1 | 6/1983 |
| FR | 2846018 A1 | 4/2004 |

* cited by examiner

*Primary Examiner* — Lee D Wilson
*Assistant Examiner* — Alvin Grant
(74) *Attorney, Agent, or Firm* — The Webb Law Firm

(57) ABSTRACT

An arrangement is provided for securing a lining material of a wall inner surface of a load-bearing construction, such as a container, apparatus, duct, housing, or column, which is acted upon by a gaseous or liquid medium. Multiple securing points are provided, and are arranged in a distributed manner and connected to the wall inner surface in order to secure the lining material. In order to reliably secure a lining material to a wall inner surface subject to great tractive forces, the fastening elements have at least one holding element which connects the wall inner surfaces to the lining material, and which can be fixed by a pressure element in a force- and/or form-fit manner.

24 Claims, 9 Drawing Sheets

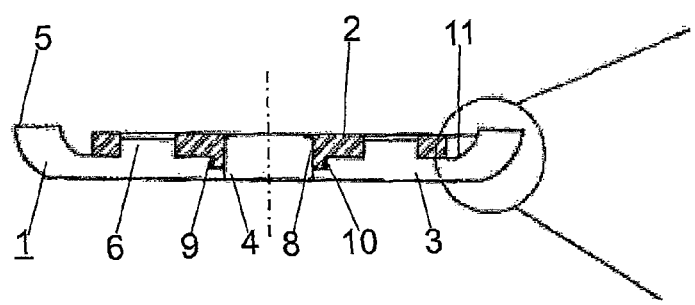
Fig. 1.1
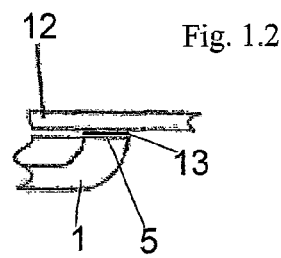
Fig. 1.2
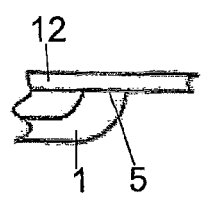
Fig. 1.3
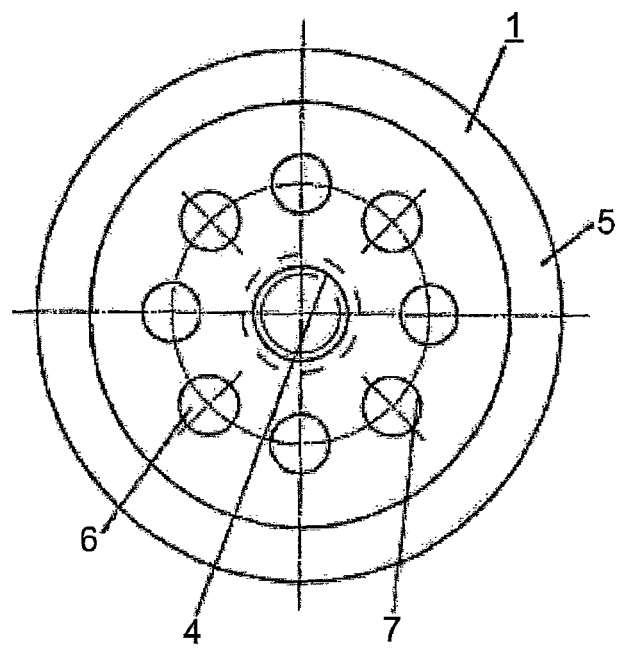
Fig. 1.4

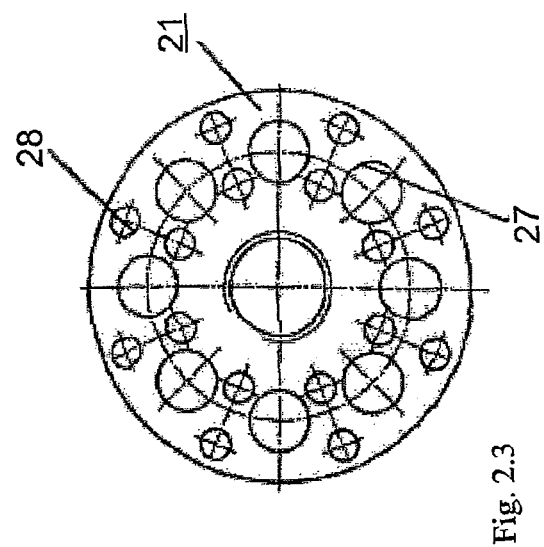
Fig. 2.3
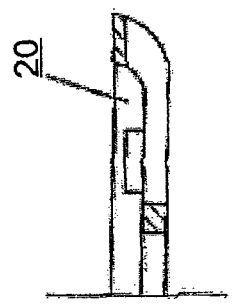
Fig. 2.4
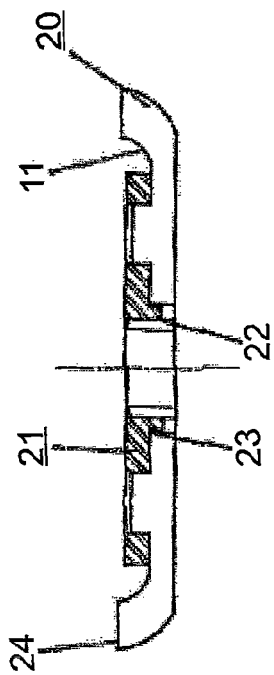
Fig. 2.2
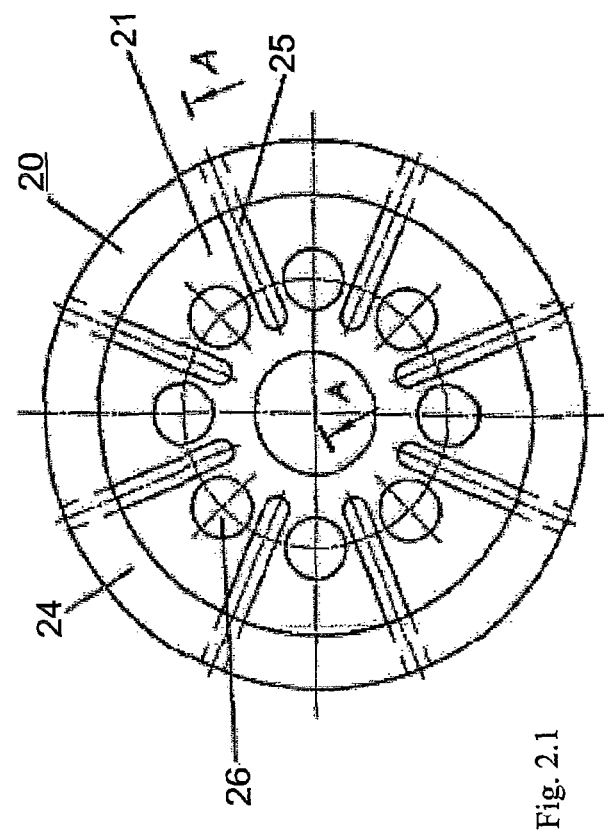
Fig. 2.1

Fig. 10.1
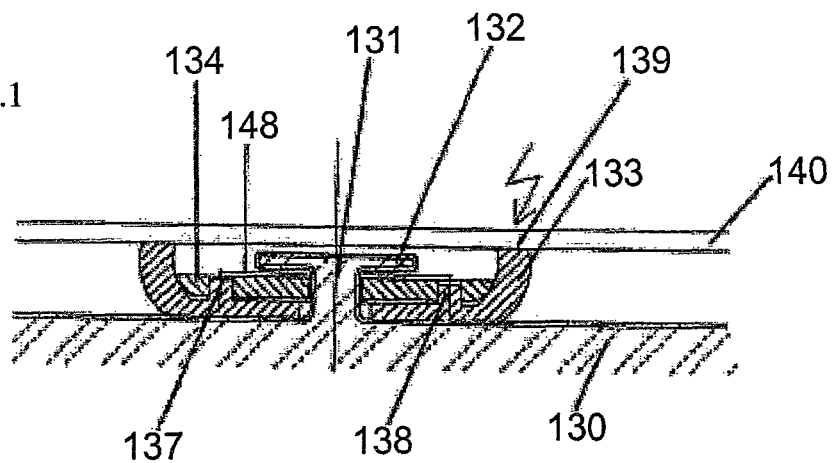
Fig. 10.2
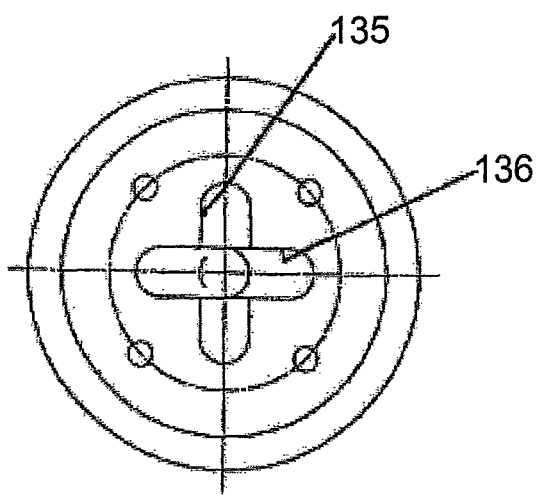

Fig. 11.1
Fig. 11.2
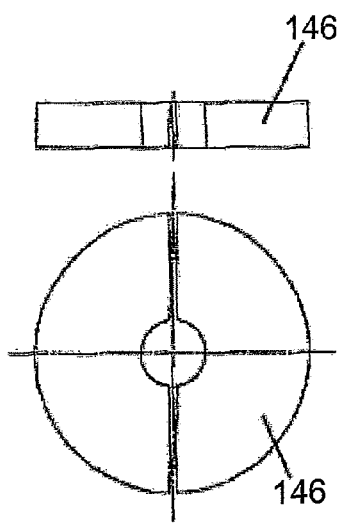
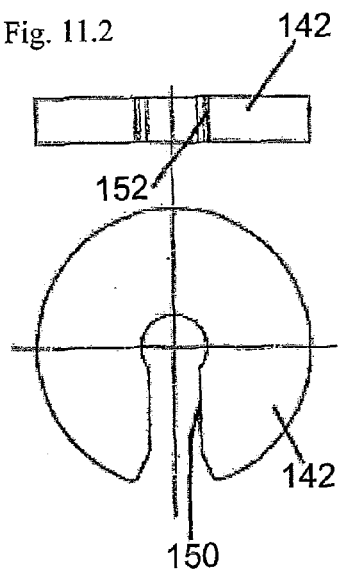
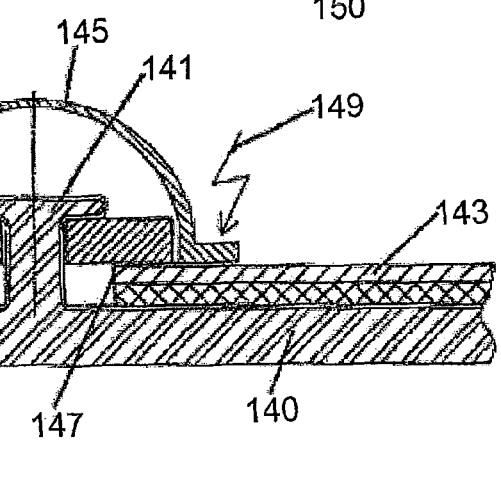
Fig. 11.3

ARRANGEMENT FOR SECURING A LINING MATERIAL

BACKGROUND OF THE INVENTION

1. Field of the Invention

The invention relates to an arrangement for securing a lining material on the wall inner surface of a load-bearing construction, such as a container, apparatus, duct, housing, or column, which is acted upon by a gaseous or liquid medium, whereby multiple securing points are provided and are arranged in a distributed manner and connected to the wall inner surface in order to secure the lining material.

2. Description of Related Art

Generic securing arrangements are necessary, for example, for lining load-bearing constructions, such as containers, apparatuses, ducts, housings, or columns, made of either metal, necessary with only a specific type of lining, or plastic, or GFRP. The materials used for this purpose are usually not acid-resistant or impure so that an additional acid-resistant or alkali-resistant lining is necessary in the container. Furthermore, a lining is required in places where work is done with corrosive gasses or liquid substances and the housing inner walls are exposed to these gases or liquids. In addition, lining materials are necessary for high-purity containers (semiconductors) and high-resistance containers (chemistry) as well as columns and other apparatuses (chemistry). To attain corrosion protection for load-bearing constructions, in particular the walls, the inner surfaces facing the current areas are therefore lined with plastic corrosion protection film (lining material). This is where MFA, PFA or FEP plastics in particular are used in film format, because such plastic offers sufficient corrosion protection. Furthermore, plastic materials that can be processed as a film and have sufficient chemical resistance can be considered.

To ensure comprehensive corrosion protection of a load-bearing construction, these are fully lined with a lining material, preferably plastic webbing, whereby the lining materials are held with numerous securing or fixing points along the wall inner surface of the load-bearing construction. The requisite securing or fixing points are hereby arranged on the inner wall of the load-bearing construction and are used for hanging, whereby only a few securing points are typically used per 2 square meter. The securing or fixing points are made of studs or similar metal parts according to known prior art and which are connected to the housing inner wall and have additional aides for use in securing the lining materials. For example, the metal securing or fixing points can be screwed into, glued to, or welded to the inner wall of a metal.

The lining materials intended for securing must be permanently connected to the wall inner surface of the load-bearing construction, in particular because based on pressure variation of liquid or gaseous media that can potentially enter the load-bearing construction and the resulting mechanical loads require sufficient holding force.

Despite existing container linings, problems can occur with especially critical chemicals because the necessary corrosion protection of the load-bearing construction, which can be made of metal, is no longer provided by the lining material. The utilized fluoroplastic materials are, at least in a limited scope, permeable to certain materials. For example, a particularly strong permeation can occur with halogen hydrogens, for example hydrogen chloride, which can form a particularly aggressive hydrochloric acid with the permeating steam, whereby these materials in their gas phase can permeate the lining material and condense behind it, so that, for example, hydrochloric acid results from the hydrogen chloride and water. Hydrogen and helium can also easily permeate this lining material but do not result in corrosion since they are non-condensing and non-corrosive. This process is particularly supported by the resulting temperatures so that a primary goal is to find good isolation. The temperature is hereby determined by the permeate composition and type and must always be high enough so that the permeate can by no means condense between the lining material and the load-bearing construction. The dew point temperature of the chemicals in question may only fall below this temperature within the isolation. Furthermore, attention should be paid that a thermal bridge is not created in order to avoid condensation formation.

SUMMARY OF THE INVENTION

This invention is therefore focused on illustrating a securing method with a clearly increased lifespan for utilized securing elements and in particular offers protection from corrosion.

According to an embodiment of the invention, solving the method requires that the securing elements have at least one holding element that combines the wall inner surface with the lining material and that can be fixed in a force-fit and/or form-fit way with a pressing element. Additional advantageous embodiments of the invention result from the subclaims.

To fulfill the increased requirements of mechanical loads in the area of the securing points, the invention includes multiple-part securing elements. The pressing element is used to fix the holding elements in a force-fit and/or form-fitted way so that the lining material can preferably be welded to the holding elements while, on the other hand, providing a force-fit connection to the wall inner surface with the pressing element. The special design of the holding elements and the pressing elements ensures that the welded lining materials remain secure even during mechanical load.

This invention includes different options for the design of the securing arrangement, which will be further elucidated in the following, whereby the type of utilized securing elements depends on whether a securing of the lining material is necessary in the horizontal floor area, the vertical wall area, or the horizontal ceiling area. Insofar as an even load distribution occurs, fixing the lining material with the securing elements is typically sufficient, while critical areas require additional measures so that the lining material is also secure in the event that tension occurs. Mechanical tension can be created, for example, when the gaseous or liquid media, which fill the load-bearing construction, are subject to great pressure variation, thereby placing the lining material under stress as a result of a vacuum. For example, improper securing of the lining material due to the flow characteristics of the utilized plastic materials can lead to material stretching and reduced density and subsequent inability to guarantee secure fixing over the long-term. With the securing arrangement according to the invention, it is possible to ensure that the lining material remains secure even at a high mechanical load with the securing elements and in particular in the area of the securing points.

The securing elements are preferably connected to the wall inner surface with securing bolts, securing cams, or securing bars, whereby the securing points are generally welded to the load-bearing construction. The securing points further serve to fix the holding elements with at least one pressing element and thus make welding the lining material possible. A plastic washer is the preferred holding element, while, on the other hand, a metal washer is used as the pressing element, which, when lying together, are intended to be secured to the wall inner surface. The plastic washer is typically a plastic that is of a similar type as the lining material and serves to achieve a weld connection between the lining material and the plastic washer with electromagnetic radiation, while the metal washer serves to connect the plastic washer with the wall inner surface of the load-bearing construction in a force-fit and form-fit manner. To this end, the plastic washer, for example, lies against an even surface of the wall inner surface, while one or multiple concentrically-arranged raised contact surfaces are formed that enable a weld point with the lining material. The contact surfaces are oriented parallel to the wall inner surface so that the lining material can be arranged on the wall inner surface at a corresponding distance. The contact surfaces consist of preferably at least one external circular ring segment and, if necessary, an internal circular ring segment, or multiple ring-shaped ridges that are preferably round but can also be edged. Furthermore, the ridges protrude into the metal washer, and are thus also available for welding with the lining material. A particular advantage should be highlighted, which is that a form-fit force transfer acting as a anti-rotation guard for the securing elements is achieved with the ridges, which protrude into the corresponding openings in the metal washer.

Insofar as the ridges are not intended to be welded to the lining material, they can be designed as recessed from the external circular ring segment or, if necessary, completely covered by the metal washer so that only a weld connection between the external circular ring segment of the plastic washer and the lining material is possible.

In a special embodiment of the invention for permeating media the plastic washer has at least one or multiple groove-like radial indentations in addition to the existing openings. The indentations serve to enable a rinsing of the gap, in particular in the area of the securing points, in the event that aggressive media breach the lining material, thereby reaching the gap between the lining material and the wall inner surface. The ring-shaped indentations initially enable a rinsing of the area behind the securing point, namely the plastic washer. Furthermore, additional embodiments of the invention provide for metal washers with additional openings corresponding to the radial indentations so that rinsing is also possible in front of the plastic washer.

The metal washer has at least one internal ring-shaped groove or multiple openings corresponding to the plastic washer ridges in order to enable the metal washer to be force-fitted and form-fitted on the plastic washer. The internal ring-shaped groove hereby corresponds to a ring-shaped ridge of the plastic washer so that lateral tension on the lining materials can also be absorbed. Insofar as the plastic washer has ridges that are ring-shaped, for example, the metal washer can have openings corresponding to the ridges of the plastic washer so that there is an additional anti-rotation guard for the securing point.

The different embodiments of metal and plastic washers can be secured to the wall inner surface using a stud or welded threaded bolt, for example with a nut, whereby the targeted pressure provides a secure hold for the plastic washer and the metal washer acting as a pressing washer. After successful assembly of the securing points, the lining material is welded to the plastic washer in at least the area of the external circular ring segment.

An alternative solution of the invention arranges for a lining material that can be welded to a plastic ring made of MFA, PFA, or FEP, which, covered by a metal ring, can be screwed into the wall inner surface with a threaded bolt, whereby a cap-shaped cover is fashioned over the threaded bolt and the plastic ring as well as the metal ring, which is also welded to the lining material. The plastic ring used for this purpose serves to strengthen the lining material, after the lining material in the area of the securing points has been punctured, in order to prevent tearing of the lining material, for example. Following a successful weld of the lining material with the ring, the ring is screwed on to the wall inner surface by means of a metal ring, a threaded bolt and a nut, whereby the achievable pressure presses the ring and the lining material located beneath it against the wall inner surface. Because the threaded bolt protrudes inwards beyond the lining material in this type of solution, a cap-shaped cover is provided, which is attached directly above the threaded bolt, the ring, and opposite the pressing washer, which is made of metal, whereby the lining material is also welded so that the area of the securing point is protected from aggressive media.

In a further special embodiment, in particular the realm of increased mechanical load, for example on the vertical wall, the lining material is punctured in the area of the securing bolt so that the lining material can be positioned on the securing bolt. In addition, the lining materials in the punctured area are strengthened by a plastic ring which is welded to the lining material. A ridge is located opposite the lining material in the punctured area and therefore also in the area of the securing point, which further enables a form and/or force-fit connection with the wall inner surface. For this purpose, the metal ring has a groove that is adjusted to the size of the plastic ring and acts as a pressing element above the lining material and the plastic ring, whereby the metal ring also surrounds the plastic ring, thereby preventing tearing of the lining material in the area of the puncture and the securing point.

In a further embodiment of the invention, it is intended that an intermediate layer that can absorb electromagnetic radiation is located between the lining material and the cover or the plastic ring and also, in a variation of the embodiment, with a direct weld between the plastic ring and the lining material. The intermediate layer absorbs electromagnetic radiation at specific wavelengths and is designed to be adjustable to the welding device being used. Preferred radiation sources to use are: solid-state lasers, gas lasers, semiconductor lasers, or an infrared source, for example a Xenon short arc lamp, or CO2 lasers.

In a further special embodiment of the invention, provision is made that the securing element consists of at least two circular ring segments acting as pressing elements, which can be attached to a securing cam with connection arrangement, for example, pins, studs, or bolts, and secure a two-part plastic washer acting as a holding arrangement. This type of securing arrangement is preferably arranged where the load-bearing construction has securing cams on the wall inner surface. The securing cams can also have an additional coating, like the wall inner surface, whereby damage to the wall inner surface can predominantly be avoided with an embodiment in which it has a securing cam and the use of two circular ring segments acting as pressing elements as well as two additional circular ring segments acting as holding arrangement and that are made of plastic. A particularly advantageous aspect of this embodiment is that the entire surface of the wall inner surface is already coated, which therefore no longer needs to be destroyed with studs, for example. The securing cam hereby enables access behind the securing cam by placing the pressing elements and holding elements behind it thereby achieving a secure and lasting durability of the securing elements. Both circular ring segments for the holding arrangement are hereby the first to surround the securing cam and subsequently the two-part pressing element in a manner that means the cutting lines of both circular ring segments are angled at least 90° away from the holding elements. To ensure the position, the pressing elements have grid-like indentations in which protruding plastic knobs reach into the holding arrangement. A securing of the pressing elements occurs with pins, studs, or bolts, so that both circular ring segments are force-fitted and form-fitted in their connection to the securing cams, whereby an elastic film material can be arranged between the securing cams and pressing elements in order to prevent damage through friction. As an additional measure, there is another option of positioning a clamping washer made of plastic below the holding element in order to increase the force-fit and form-fit and, furthermore, balance any possible height difference between the securing cams and the recoiling wall inner surface, whereby the inserted clamping washer can also be welded to the holding element, if necessary. This type of securing arrangement is particularly advantageous if, for example, the load-bearing construction has an inner coating consisting of a two-component material, enamel, phenolic resin, stove enamel, rubber coating, or flame spray coating. The securing elements used for this do not damage the pre-existing coating and still provide a secure force-fit and form-fit with the wall inner surface. Upon fixing the securing element, the lining material can be welded to the holding arrangement in the typical manner, whereby the welding preferably occurs with electromagnetic radiation. The requisite force between the circular ring segments of the pressing element and the circular ring segments of the holding arrangement is created by the corresponding protrusions or indentations and simultaneously secure the anti-rotation guard of both utilized pressing elements and both holding arrangement against each other. The holding elements used for this are in the shape of plastic washers and also have a contact surface for welding with the lining material, thereby enabling a reasonable method for attaching the lining material.

In another alternative embodiment of the invention, it is arranged so that the securing elements consist of at least two circular ring segments acting as holding elements and at least two tension rings acting as pressing elements, which can be secured to a securing cam in a radial direction with a form-fit. Securing occurs as described in the previous example, by applying both holding elements and subsequent application of both pressing elements, whereby these can also be braced with an encompassing external ring. With the positioned external ring, a distancing of the two-part pressing elements and the two-part holding elements is prevented. Simultaneously, a form-fit is created between the holding elements and the pressing elements, through which avoidance of the plastic washer tipping out of the securing level is achieved. The single-part encompassing external ring acts as a safety and can also be positioned with the pressing elements, thereby also creating a force-fit and form-fit. In addition, this embodiment variation can include an external ring made of metal or plastic that can be welded to the wall inner surface, for example, if the load-bearing construction is made of metal or plastic.

In a further special embodiment of the invention, the securing elements have an additional seal element, which is preferably positioned on the securing bolt and pressed with a clamping ring. In addition, the clamping ring is welded with the lining material so that a subsequent loosening can be prevented. This type of construction is provided so that the seal element rests directly on the wall inner surface, namely around the securing bolt, so that a secure fixing to the lining material is provided with the clamping ring and the pressure created by the additional securing elements. This embodiment further offers the possibility that a first lining material lies directly on the clamping ring and a distanced second lining material, which is welded with a plastic holding element, whereby the holding element can be secured to the securing bolt by means of a metal washer. In the aforementioned solution, the metal ring preferably has its own interior thread so that the metal ring can be screwed onto the securing bolt, thereby bracing and creating the necessary pressure for the seal element.

All of the previously stated embodiment variations can hereby be arranged to have an intermediate layer for absorbing electromagnetic radiation located between the lining material and a possible cover, whereby a subsequent weld of various plastics elements is possible with electromagnetic radiation.

In a further special embodiment of the invention, the securing cam is not round but rod-shaped at its open end and is connected to the wall inner surface in one piece. Furthermore, a holding element can be positioned on the rod-shaped securing cam, together with a pressing element with a corresponding slit, whereby a 90° rotation of the pressing element can create a force-fit and form-fit with the securing cams. To avoid a later loosening of the pressing element and holding element, an additional form-fit is provided by holding element cams and corresponding recesses in the pressing element. The protruding holding element cams reach into the existing recesses following a rotation of the pressing element by approx. 90°, thereby enabling an anti-rotation guard, whereby, in this solution, quick assembly of the individual securing elements is possible without much effort. After fixing the securing elements, the lining material can subsequently be welded directly to the plastic washer, i.e. to the holding element. The special advantage of this solution, as with the previously stated solutions, is that securing cams of any design can be coated, in particular with a plastic, ceramic, or enamel coating, so that the wall inner surface of the load-bearing construction has a first protective coating against aggressive media and, furthermore, can have an additional protective coating provided with the lining material. The special advantage of this solution is furthermore that the load-bearing construction and, if necessary, the existing coating as well as the lining material, create a gap that prevents an increased accumulation of damaging materials with suitable ventilation. This means that, insofar as hydrogen chloride and hydrogen permeate the lining material and reach the gap and creates hydrochloric acid at corresponding temperatures, it can be suctioned out in order to prevent damage to the load-bearing construction and the securing bolts. Furthermore, hydrochloric acid or other damaging gasses or liquids can be decreased with back ventilation and suction, leading to a considerable reduction in corrosion.

In a further special embodiment, the securing arrangement is a securing cam positioned on a punctured lining material. Subsequently, a slit or split plastic washer of corresponding stability and thickness is positioned on the tapered part of the securing cams so that a force-fit and form-fit is created and the lining material is pressed against the wall inner surfaces. Afterwards, an additional sealing of the securing arrangement can occur with a cap-shaped cover, whereby an arresting of the plastic washer is simultaneously achieved by the cover after welding the cover to the lining material and slippage of the plastic washer off the securing cams can be prevented. This securing arrangement can be used for both coated and uncoated securing cams.

The securing cams can be trapezoidal, t-shaped, mushroom-shaped, or triangular-shaped and in special cases, for example for one of the preceding securing elements, rod-shaped at the open end so that the intended securing elements, such as holding elements and pressing elements can be positioned with existing corresponding slits and braced against the wall inner surface at an approx. 90° rotation.

Highly fluorinated thermoplastic is primarily used as the lining material, plastic rings, cover, or cover flaps are preferably made of FEP, MFA, PFA, or modified PTFE, whereby the absorbing coating in the intermediate layer can consist of the same concentrated plastic materials since welding is to occur with electromagnetic radiation.

The invention is further described based on the Figures.

BRIEF DESCRIPTION OF THE DRAWINGS

Shown are

FIGS. 1.1-1.4: a top view and cropped side view of a plastic washer and metal washer according to the invention for use at a securing point as well as in two enlarged cropped representations of the welded area of the lining material, FIGS. 2.1-2.4: a top view and cropped side view of another embodiment of a plastic washer as well as in two enlarged cropped representations of the cut according to the cutting line A-A and in a top view of an accompanying metal washer.

DESCRIPTION OF THE PREFERRED EMBODIMENTS

Figure 3:
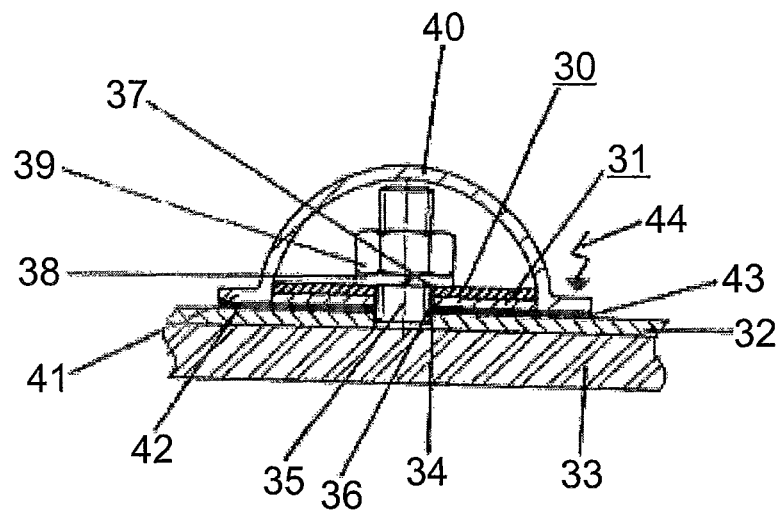
FIG. 3: a cropped side view, an additional embodiment variation for securing a lining material with a plastic washer and a metal washer according to FIG. 3, FIG. 4: a cropped side view, an additional embodiment variation according to FIG. 3 with an additional centering of the plastic washer.

FIGS. 1.1 through 1.4 show a top view and a cropped side view of both single parts provided as securing points, namely a plastic washer 1 and a metal washer 2. The plastic washer 1 has a level back panel 3, which comes to rest directly on the wall inner surface of a container, apparatus, duct, or housing, not shown. A central drilled hole 4 affords the possibility of screwing the plastic washer into the wall inner surface, whereby a stud is typically used, and which was previously welded to the wall inner surface, for example in the case of metal. Subsequently, the plastic washer 1 is positioned on this stud followed by a metal ring 2, which creates an even pressure for pressing the plastic washer 1 against the wall inner surface, after successful screw connection.

The plastic washer 1 has a contact surface 5 that is created by an external circular ring segment. The contact surface 5 is designed to be welded with the lining material. Furthermore, in the embodiment of the invention shown, the plastic washer 1 has multiple ring-shaped ridges 6. The ridges 6 can also be designed to be welded with the lining material, however, they can also be designed as recessed opposite the contact surface 5 so that the contact surface 5 can easily be used as an anti-rotation guard between metal washer 2 and plastic washer 1.

The metal washer 2 being utilized has openings 7 corresponding to the ridges 6 through which the ridges 6 of the plastic washer 1 protrude. In addition, the metal washer 2 has a drilled hole 8, so that the metal washer 2 can be positioned on the threaded bolt together with the plastic washer 1. To secure the assembly, a further protrusion 9 is provided that rests in an inside thread 10 in the plastic washer 1, thereby enabling a centering of metal washer 2 and plastic washer 1. After joining the plastic washer 1 and the metal washer 2, the metal washer 2 rests in an indentation 11 in the plastic washer 1 so that the plastic washer 1 is almost completely recessed with the circular contact surface 5 and can thereby easily create a direct contact between the lining material and the contact surface 5 and, if necessary, with the ridges 6.

The enlarged and cropped partial views also show the contact surface 5, whereby in the upper partial view, an intermediate layer 13 is positioned between the lining material 12 and the plastic washer 1 that can absorb electromagnetic radiation so that the plastic washer 1 and the lining material 12 can be welded together with heat using electromagnetic radiation. The second partial view shows an embodiment variation in which the plastic washer 1 is also made of an absorbing material so that the lining material 12 can be welded to the plastic washer 1 directly with electromagnetic radiation.

FIGS. 2.1 through 2.4 show a further embodiment in which a plastic washer 20, in a top view and a cropped side view, as well as the metal washer 21 are designed to be used with the plastic washer 20, in a cropped partial view according to the cutting line A-A and in a further top view.

As in the embodiment according to FIG. 1, the plastic washer 20 also has a central opening 22 with a radial extension 23 and a trough-shaped indentation 11 which is provided for receiving the metal washer 21. Welding with the lining material occurs with a contact surface 24 similar to the shown options according to FIG. 1. In contrast to the embodiment variation according to FIG. 1, the plastic washer has radial trough-shaped indentations 25 that diverge in a star-like pattern and enable rinsing behind the plastic washer in the event of a breach of gaseous or liquid media through the lining material. Furthermore, in addition to the contact surface 24, the plastic washer 20 has ring-shaped ridges 26 that are designed to correspond to the openings 27 of the metal washer 21. The metal washer 21 is thereby comparable to the metal washer from FIG. 1; however this metal washer has additional openings 28, which are doubled and widely distributed, particularly corresponding to the trough-like indentations 25, so that, following assembly, the openings 28 rest directly above the indentations 25. These measures ensure that, in the event of a breach of aggressive media, the plastic washer and the metal ring in the upper area can be rinsed.

FIG. 3 shows an alternative securing method in which a metal washer 30 and a plastic washer 31 are also used. In contrast to the embodiment variations according to FIGS. 1 and 2, this solution has the lining material 32 resting directly on the wall inner surface 33 and is crimped with a stud 34, the plastic washer 31, and the metal washer 30. In this first design, the plastic washer 31 has a central opening 36, which enables the plastic washer 31 to be positioned on the securing bolts 35. Furthermore, the metal washer 30 also has an opening 37, so that the metal washer 30 is subsequently positioned on the securing bolts 35 and can be braced with a washer 38 and a nut 39. To protect the securing bolt 35, which would otherwise be exposed to aggressive media, a cover 40 is provided, that is designed as half-circle-shaped in this embodiment and has a flange-shaped molded part 41 on its edge, the plane surface 42 of which comes to rest on the lining material 32. Between the lining material 32 and the plane surface 42 is located an intermediate layer 43 for the absorption of electromagnetic radiation so that the cover 40 can be welded to the lining material 32 with electromagnetic radiation 44. This measure enables complete protection of the securing bolt 35 against aggressive media and thereby against corrosion. In addition, the intended welding procedure provides a secure and lasting connection between the cover 40 and the lining material 32, whereby in particular a tearing off of the cover 40 due to possible tension is not a concern since there are no external weld seams and, in particular, there are surface weld points between the lining material 32 and the plane surface 42.

Figure 4:
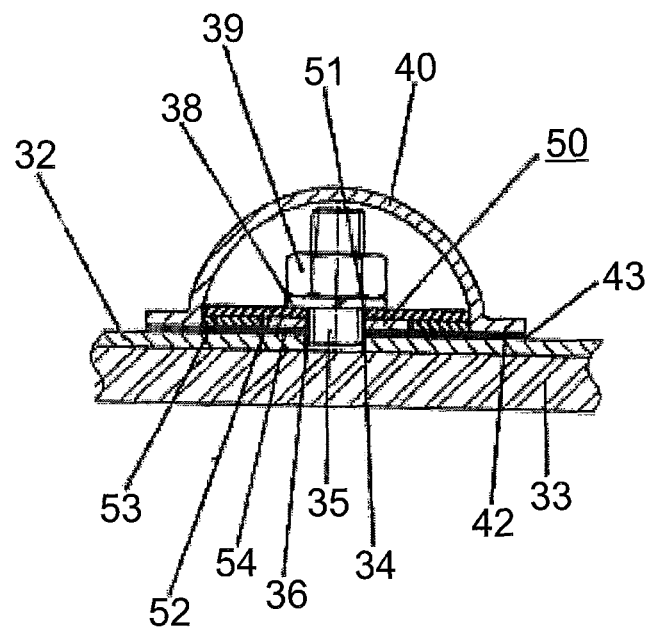

FIG. 4 shows a cropped side view of a further solution according to FIG. 3. Just as in the previously described solution, a lining material 32 is attached to a wall inner surface 33 with a securing bolt 35, which protrudes through an opening 34 in the lining material 32 and makes a bracing of the lining material 32 by the wall surface 33 possible. A bracing occurs, as in the previously known embodiment, with a nut 39 and a washer 38, whereby this solution, however, utilizes a plastic washer 50 of a smaller diameter, which also has a central opening 51 so that the plastic washer 50 can be positioned on the securing bolt 35. Above the plastic washer 50 there is a metal washer 52 that can either be used in a welded state as a single-part or as a double-part. The unique aspect of the metal washer 52 is that it is designed to have an edge that is reinforced by an external circular ring segment 53, whereby this circular ring segment 53 encompasses the plastic washer 50 so that a form-fit of the lining material 32 is also achievable in addition to a force-fit. In particular, the metal washer 52 prevents slippage or sliding of the lining material 32 and the plastic washer 50 out of the securing point area. The stud 35 is also covered by a cover 40, whereby this cover 40 is connected to the lining material 32 surface by a plane surface 42 so that there is no notching effect that could lead to a possible tear in the lining material 32, even towards the outside and as according to FIG. 3. In order to weld the cover 40 to the lining material 32, an intermediate layer 43 is used that can absorb electromagnetic radiation, thereby leading to welding with a warming of the plastic materials. Furthermore, the plastic washer 50 is also welded to a lining material 32 with an intermediate layer 54 so that the opening 34 is further reinforced.

This embodiment variation for a securing point is preferably implemented in a vertical area where considerably more tension is placed on the lining material 32 so that slippage of the lining material 32 from the wall inner surface and in particular a sliding out below the securing points can be prevented. The illustrated securing solutions for a lining material 32 on a wall inner surface 33 disclose independent, different solutions, whereby a combination of the different variations is easily conceivable. In particular, a large pressing surface between the lining material 32 and the wall inner surface 33 is desired and, furthermore, at points where anti-rotation guard is necessary for rotation prevention or preventing slippage below the metal washer 52, for example with an additional bracketed plastic washer 50.

Figure 5:
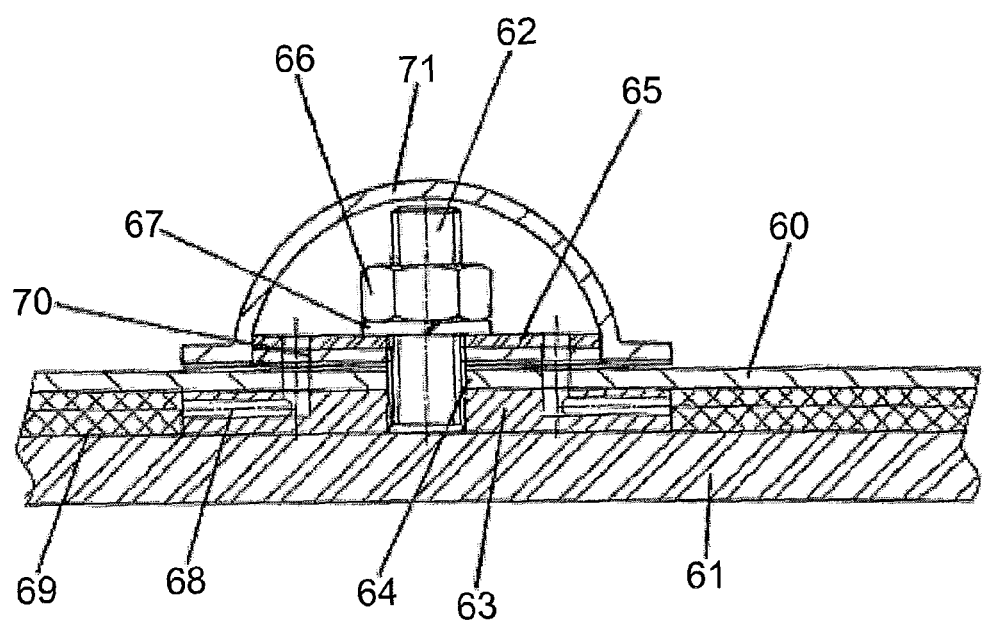
FIG. 5: a cropped side view, an additional embodiment for the securing element, consisting of a plastic washer and a metal washer and a cover fashioned over the top thereof.

FIG. 5 shows a cropped side view of an additional embodiment of a securing arrangement for lining materials 60 that can be fixed on a load-bearing construction, i.e. on a wall inner surface 61. To secure the lining materials 60, a securing bolt 62 is provided on which a fixing washer 63 is initially positioned, followed by the lining material 60. The lining material has a drilled hole 64 for this purpose. In the securing bolt 62 area, a further pressing washer 65 is added and braced with a nut 66 so that force- and form-fit are possible. To secure the nut, a lock washer 67 is provided that lies directly on top of the fixing washer 65. The fixing washer 63 has a flushing duct 68 that ends at the gap 69 between the wall inner surface 61 and the lining material 60 via a ring-shaped groove 72. After assembly of the lining material 60, i.e. after tightening the nut 66, multiple peripherally-distributed drilled holes 70 are subsequently introduced so that a connection to the groove 72 and the flushing duct 68 is created. Furthermore, upon conclusion of work, a cover 71 is welded to the lining material 60 so that the interior space of the lining 71 where the securing bolt 62 and the nut 66 are located is protected from aggressive media. The existing drilled holes 70, the groove 72, and the flushing duct 68 hereby enable a flushing of the interior space below the cover 71 so that the bolt is also protected from corrosion based on the existing flushing in the event of a permeation of aggressive media. In the alternative, a pressing washer 65 with an inner thread can be used in place of a nut 66 so that the pressing washer 65 can be screwed onto and braced directly against the securing bolt 62. The requisite drilled holes 70 are supplementary in this assembly variation, i.e. they were added after successful assembly in order to create the connection to the groove 72 and the flushing duct 68.

Figure 6:
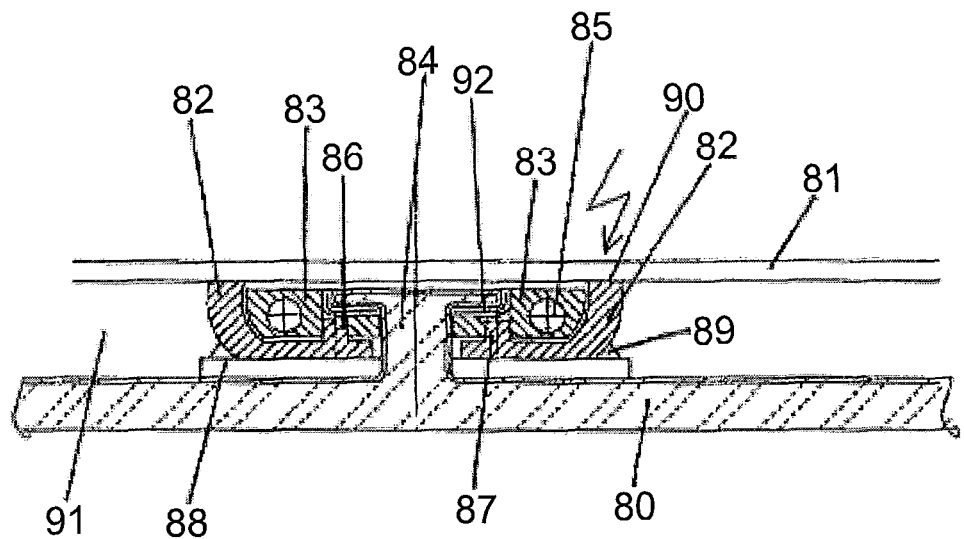
FIG. 6: a cropped side view of a securing cam with a two-part holding and pressing element fashioned to the top thereof.

FIG. 6 shows a cropped side view of a wall inner surface 80 with a lining material 81 that is connected to the wall inner surface 80 with a suitable securing arrangement. In this case, at least one two-part plastic washer 82 acting as a holding element and one two-part pressing washer 83 are provided for securing purposes, whereby the latter is preferably made of metal. For securing a lining material 81, a securing cam 84 is provided that is connected to the wall inner surface 80 as a single part, whereby the securing cam 84 and the wall inner surface 80 have a coating 93. Initially, the two-part plastic washer 82 is placed around the securing cam 84 as a holding element, and subsequently the two-part pressing washer 83, so that a form-fit is created with the securing cam 84. Bracing of both pressing washers 83 occurs via securing pins 85, whereby the pressing washers 83 press the plastic washers 82 against the wall inner surface 80. In order to avoid a loosening of the pressing washer 83, these have multiple distributed recesses 86, which are gripped by protruding cams 87 belonging to the two-part plastic washer 82. This also creates a form-fit between the plastic washer 82 and the pressing washer 83 and prevents a rotation of washers against each other, thereby preventing a loosening of the securing cam 84. To create more bracing force at the wall inner surface 80, a plastic washer 88 that is also two-part is positioned underneath and therefore rests directly beneath the plastic washer 82. The thickness of the plastic washer 88 can be tailored depending on the distance between the securing cam 84 and the plastic washer 82 being used so that a form and force-fit exists. The plastic washers 88 are connected to the plastic washers 82 with a weld seam 89 so that a subsequent loosening is impossible. Following assembly of the securing elements and application of the lining material 81, these can be welded to the contact surface 90 of the plastic washer 82 so that the entire construction is protected from aggressive media. This creates a gap 91 between the lining material 81 and the wall inner surface 80, which can also be rinsed under special circumstances. The special advantage provided by this embodiment is that a pre-coated securing cam 84 can be used, thereby preventing mechanical damage. Insofar as there is contact between the metal pressing ring 83 and the securing cam 84, a protective film 92 can also be provided.

Figure 7:
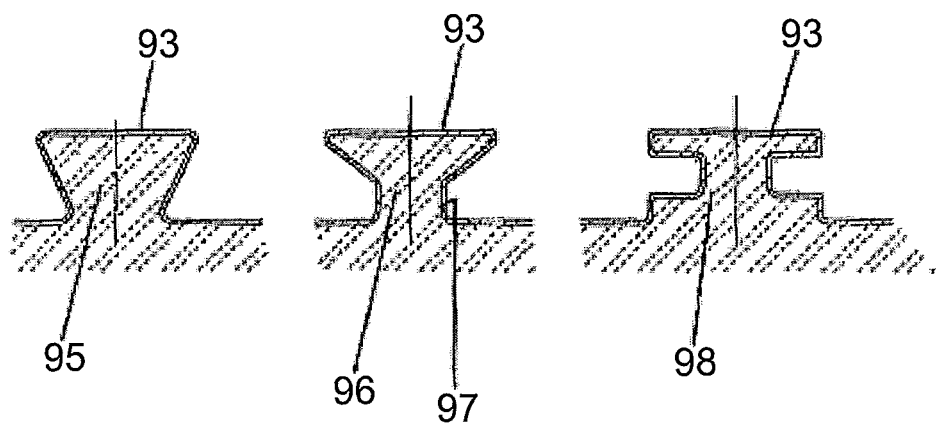
FIG. 7: a cropped side view of three possible designs of the securing cam according to FIG. 6, FIG. 8: a cropped side view, an additional embodiment variation with a cross-section T-shaped securing cam and split holding and pressing elements, further fixed with an outer ring.

FIG. 7 shows three different variations of the securing cam embodiments, from left to right, a trapezoidal cam 95, a triangular cam 96 with a taper 97, and a t-shaped cam 98, which have a coating 94. The embodiment examples of the securing cams 95, 96, 98 shown here are not limiting and act only as suggestions for further embodiments. Further variations of securing cams can be gleaned from the Figures below.

Figure 8:
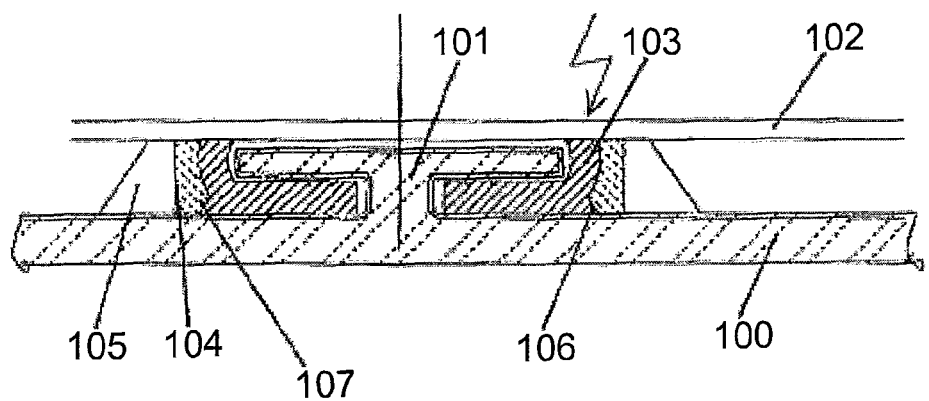

FIG. 8 shows a cropped side view of a further embodiment of the securing elements and these are used with a wall inner surface 100 that has a securing cam 101 in order to weld a lining material 102 with a two-part plastic ring 103. The two-part plastic ring 103 is held together by a two-part pressing ring 104, whereby a pressure is initially applied to the pressing ring 104 and then to the plastic ring 103 with a single-part external ring 105. The securing cam 101 used to do so is illustrated in the t-shape in a cross-section so that the plastic rings 103 can reach behind the securing cams 101, whereby a form-fit is additionally achieved between the plastic ring 103 and external pressing ring 104 through an indentation and a protrusion 107. In this specific embodiment, the form-fit, which is located near the wall inner surface 100, also prevents tipping of the plastic rings. Insofar as a plastic ring is used as the external ring 105, it can potentially also be welded like the plastic ring 103 with the lining material 102 or the metal ring with the wall inner surface 100.

Figure 9:
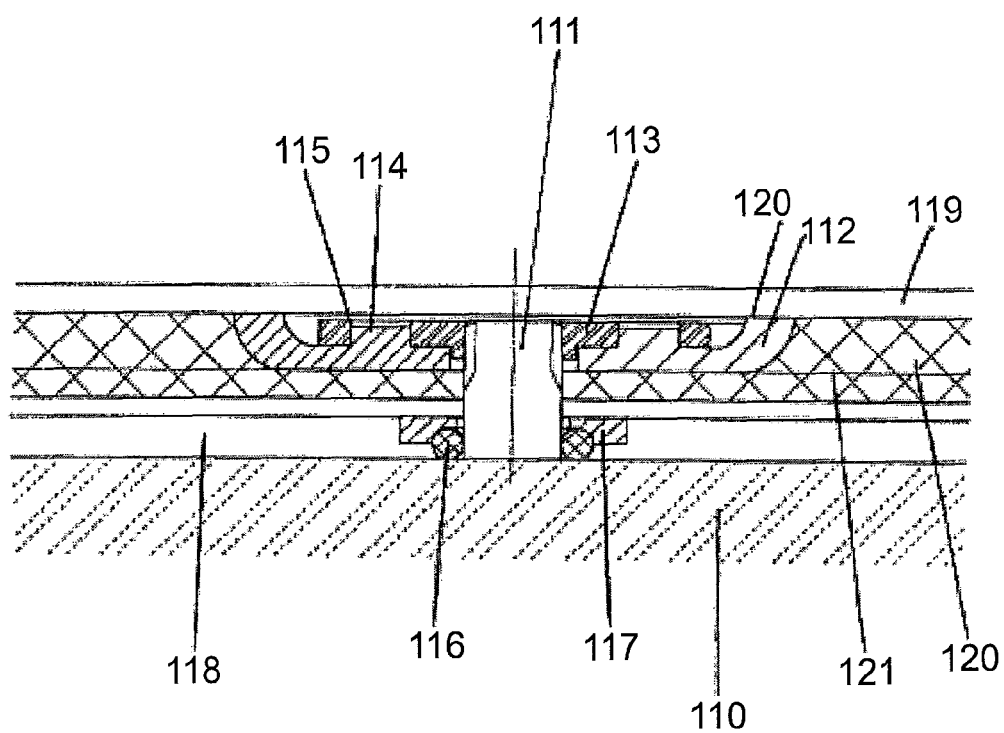
FIG. 9: a cropped side view, a special design with an additional sealing measure across from the securing pins and the inner wall surface, FIGS. 10.1-10.2: a cropped side view and a top view, an additional solution variation in which the single-part holding and pressing elements are set atop a single-part, shaped cam, which are rod-shaped on its protruding end, and FIGS. 11.1-11.3: a cropped side view, an additional embodiment variation, in which the lining material can be attached to a slit plastic ring on a securing cam, which is also protected by a cover.

FIG. 9 shows a cropped side view of an additional embodiment of a securing arrangement on a wall inner surface 110 with a securing bolt 111, which is directly connected to the wall inner surface 110. A plastic washer 112 and a pressing washer 113 are used, as illustrated in FIG. 2. To achieve an anti-rotation guard, the plastic washer 112 has protruding cams 114, which enter into corresponding openings 115 in the pressing washer 113. To expand the solution disclosed in FIG. 2, a seal ring 116 surrounds the securing bolt 111 and can be pressed against the wall inner surface 110 with a pressing washer 117. A first lining material 118 lies on the pressing washer 117, while the additional lining material 119 lies on the contact surface 120 and can be welded with it. The lining material 118 closest to the wall inner surface 110 and the lining material 119 above it create a gap 120, which is filled by a spacer gas 121.

FIGS. 10.1 and 10.2 show a cropped side view and a top view of an additional embodiment variation for a securing arrangement. This particular variation has a wall inner surface 130 and securing cam 131 that have already been coated, whereby the securing cam 131 is designed as protruding from the front end 132 in a rod shape. The securing cams 131 are single-part pieces connected to the wall inner surface 130 and further serve to receive a single-part plastic washer 133 and a single-part pressing washer 134. Both the plastic washer 133 and the pressing washer 134 have a slit-like recess 135 or 136 and can therefore be placed on the securing cam 131. After rotating the pressing washer 134, it can be braced behind the securing cam 131, whereby a form and force-fit can simultaneously be created between the plastic washer 133 and the pressing washer 134 through the recesses 137 and cams 138. This assembly is particularly advantageous because the plastic washer 133 is initially placed on the securing cam 131 and can potentially already be rotated 90°. Furthermore, the pressing washer 134 is placed on the securing cam 131 and also rotated 90° so that it reaches behind the securing cam 131. With the resulting form-fit created by the cams 138 in the recesses 137, an anti-rotation guard is also created so that the pressing washer 134 opposite the plastic washer 133 can only be rotated by force, thereby creating a force-fit and form-fit with a pressing of the plastic washer 133 opposite the wall inner surface 130. Via the contact surface 139, a weld is then created with the lining material 140, which rests directly on said contact surface, whereby welding can occur with electromagnetic radiation, as outlined in previous embodiment examples. A protective film 148 is located between the securing cam 131 and the pressing washer 134. The top view clearly shows how the recesses 135,136 are designed and furthermore illustrates that they are two single-part washers, namely the plastic washer 133 and the pressing washer 134.

FIGS. 11.1 through 11.3 show a cross-sectional side view of a wall inner surface 140 with a securing cam 141 that is designed to be t-shaped in the cross-section. In this case, the securing elements consist of one single-sided slit plastic washer 142 or a split plastic washer 146, which can be positioned under the securing cam 141, if so desired. Previously, the lining material 143 was positioned over the securing cam 141, whereby the lining material 143 had an opening 147. The lining material 143 lies on top of a spacer material 144, which also has a opening 148 so that both the spacer material 144 and the lining material 143 can be positioned over the securing cam 141. The plastic washer 142 or, in the alternative, 146 is clipped under the securing cam 141 after the lining material 143 is positioned so that the lining material 143 is pressed against the wall inner surface 140 together with the spacer material 144. To secure the plastic washer 142 or, in the alternative, 146, a cap-shaped cover 145 is used, which grips the plastic washer 143, 146 and is welded to the lining material 143 with electromagnetic radiation 149. In this way, a fixing of the plastic washer 142, 146 is achieved with a cover 145, which creates the necessary form and force-fit with the wall inner surface 140. The above cropped side view shows the two plastic washers again in a side view and top view, from which it can be seen that the plastic washer 142 has a slit recess 150, while the plastic washer 146 is split in two.

REFERENCE NUMBER LIST 1 plastic washer
2 metal washer
3 back panel
4 drilled hole
5 contact surface
6 ridge
7 opening
8 drilled hole
9 protrusion
10 inside thread
11 indentation
12 lining material
13 intermediate layer
20 plastic washer
21 metal washer
22 opening
23 expansion
24 contact surface
25 indentations
26 ridges
27 opening
28 opening
30 metal washer 31 plastic washer
32 lining material
33 inner wall surface
34 opening
35 securing bolt
36 opening
37 opening
38 washer
39 nut
40 cover
41 molded part
42 plane surface
43 temporary position
44 electromagnetic radiation
50 plastic washer
51 opening
52 metal washer
53 circular ring element
54 temporary position
60 lining material
61 inner wall surface
62 securing bolt
63 fixing washer
64 punch hole
65 pressing washer
66 nut
67 lock washer
68 flushing duct
69 gap
70 drilled hole
71 cover
72 groove
80 inner wall surface
81 lining material
82 plastic washer
83 pressing washer
84 securing cam
85 securing pin
86 recess
87 cam
88 plastic washer
89 weld seam
90 contact surface
91 gap
92 protective film
93 coating
94 coating
95 cam
96 cam
97 taper
98 securing cam
100 inner wall surface
101 securing cam
102 lining material
103 plastic ring
104 pressing ring
105 external ring
106 indentation
107 protrusion
109 inner wall surface
110 inner wall surface
111 securing bolt
112 plastic washer
113 pressing washer
114 cam
115 opening
116 seal ring
117 pressing washer
118 lining material
119 lining material
120 contact surface
121 spacer gas
130 inner wall surface
131 securing cam
132 end
133 plastic washer
134 pressing washer
135 recess
136 recess
137 recess
138 cam
139 contact surface
140 inner wall surface
141 securing cam
142 plastic washer
143 lining material
144 spacer material
145 cover
146 plastic washer
147 opening
148 protective film
150 recess

The invention claimed is:

1. An arrangement for securing a lining material on a wall inner surface of a load-bearing construction which is acted upon by a gaseous or liquid medium, comprising multiple distributed securing points connected to the wall inner surface to secure the lining material and on which securing elements are respectively arranged, wherein the securing elements comprise at least one holding element that connects the wall inner surface to the lining material and a pressing element, which fixes the holding element in a force- and/or form-fit, and wherein the lining material is welded to the at least one holding element.

2. The arrangement for securing a lining material according to claim 1, wherein the securing points comprise securing bolts, securing cams, or securing bars.

3. The arrangement for securing a lining material according to claim 1, wherein the at least one holding element comprises a plastic washer and the pressing element comprises a metal washer.

4. The arrangement for securing a lining material according to claim 3, wherein the at least one holding element rests against a corresponding surface on the wall inner surface and comprises multiple concentric, raised contact surfaces.

5. The arrangement for securing a lining material according to claim 4, wherein the contact surfaces consist of one external circular ring segment and at least one internal circular ring segment or multiple ring-shaped ridges.

6. The arrangement for securing a lining material according to claim 5, wherein the inner contact surfaces and ridges are recessed from the external circular ring segment.

7. The arrangement for securing a lining material according to claim 3, wherein the at least one holding element has at least one groove-like indentation that runs radially.

8. The arrangement for securing a lining material according to claim 3, wherein the pressing element comprises an internal ring-shaped groove or multiple openings corresponding to the ridges of the at least one holding element.

9. The arrangement according to claim 3, wherein the pressing element, after being inserted in the at least one holding element, is positioned in a recessed manner with respect to the contact surfaces connecting the at least one holding element with the lining material.

10. The arrangement for securing a lining material according to claim 5, wherein the pressing element comprises openings corresponding to the ridges of the at least one holding element.

11. The arrangement for securing a lining material according to claim 2, wherein the securing points comprise securing cams, and wherein the securing elements comprise a holding element consisting of at least two circular ring segments and a pressing element consisting of at least two tension rings and an external ring, said circular ring segments and said tension rings being positioned around a securing cam and being braced by a single-part, encompassing external ring.

12. The arrangement for securing a lining material according to claim 11, wherein the securing points comprise securing bolts, and wherein the securing elements further comprise a sealing element that is positioned on the securing bolt and pressed with a clamping ring, said clamping ring being welded to the lining material.

13. The arrangement for securing a lining material according to claim 11, wherein an intermediate layer that absorbs electromagnetic rays is between the lining material and the cap-shaped cover or between the lining material and the holding element.

14. The arrangement for securing a lining material according to claim 11, wherein the securing cams are trapezoidal, t-shaped, mushroom-shaped, triangle-shaped or rod-shaped at free ends thereof.

15. The arrangement for securing a lining material according to claim 2, wherein the securing bolts, the securing cams or the securing bars are coated with a plastic, ceramic, or enamel coating.

16. The arrangement for securing a lining material according to claim 3, wherein the securing points comprise securing cams, and wherein the pressing element and the holding element have slit-shaped recesses for a securing cam and are designed with corresponding cams and recesses to create a form-fit between the holding element and the pressing element.

17. An arrangement for securing a lining material on a wall inner surface of a load-bearing construction which is acted upon by a gaseous or liquid medium, comprising multiple distributed threaded bolts connected to the wall inner surface to secure the lining material, wherein the lining material is punctured in the area of the threaded bolts and is positioned on the threaded bolts such that the threaded bolts extend through the lining material, wherein the lining material comprises a plastic ring in the area of the punctures, said plastic ring being welded to the lining material for strengthening of the lining material and screwed on a threaded bolt by means of a metal ring that covers the plastic ring such that the metal ring is provided above the lining material and the plastic ring, and wherein a cap-shaped cover is arranged over the threaded bolt, the plastic ring and the metal ring, said cap-shaped cover being welded to the lining material.

18. The arrangement according to claim 17, wherein the metal ring comprises a groove adjusted to the size of the plastic ring which is arranged in the groove.

19. An arrangement for securing a lining material on a wall inner surface of a load-bearing construction which is acted upon by a gaseous or liquid medium, comprising multiple distributed securing cams connected to the wall inner surface to secure the lining material and on which securing elements are respectively arranged, wherein the securing elements comprise a holding element consisting of two circular ring segments and a pressing element consisting of at least two circular ring segments, and wherein the pressing element braces the holding element in a securing cam, said holding element being made of plastic and welded to the lining material.

20. The arrangement for securing a lining material according to claim 19, wherein the holding element comprises a plastic washer and has at least one contact surface configured to be welded to the lining material.

21. The arrangement for securing a lining material according to claim 19, wherein the holding element and the pressing element are secured to a securing cam with a form-fit.

22. The arrangement for securing a lining material according to claim 19, wherein the securing elements further comprise a clamping washer pressed in below the holding element.

23. The arrangement for securing a lining material according to claim 22, wherein the clamping washer is welded to the holding element.

24. An arrangement for securing a lining material on a wall inner surface of a load-bearing construction which is acted upon by gaseous or liquid medium, comprising multiple distributed securing cams connected to the wall inner surface to secure the lining material, wherein the lining material is punctured in the area of the securing cams and is positioned on the securing cams such that the securing cams extend through the lining material, and wherein the lining material is held to a securing cam by a slit plastic washer or a split plastic washer, pressing the lining material against the wall inner surface and which is held in place by a cap-shaped cover which is arranged over the securing cam and the plastic washer, said cap-shaped cover being welded to the lining material.

* * * * *